United States Patent [19]

Nakamura et al.

[11] Patent Number: 5,393,337
[45] Date of Patent: Feb. 28, 1995

[54] ROSIN EMULSION SIZING AGENT, PAPER SIZED THEREWITH AND METHOD OF SIZING USING THE SAME

[75] Inventors: Katsunori Nakamura; Kazuki Nagao; Masayuki Monobe, all of Ichihara, Japan

[73] Assignee: Japan PMC Corporation, Tokyo, Japan

[21] Appl. No.: 961,180

[22] Filed: Oct. 15, 1992

[30] Foreign Application Priority Data

Oct. 18, 1991 [JP] Japan ................................. 3-333830

[51] Int. Cl.[6] .................. C09D 193/04; D21H 21/16
[52] U.S. Cl. .................... 106/238; 106/144; 106/212; 162/180; 530/217
[58] Field of Search ............... 162/180; 106/238, 144, 106/212; 530/217

[56] References Cited

U.S. PATENT DOCUMENTS

| | | | |
|---|---|---|---|
| 3,865,769 | 2/1975 | Davison | 106/238 |
| 3,966,654 | 6/1976 | Aldrich | 162/180 |
| 4,199,369 | 4/1980 | Hughes et al. | 106/238 |
| 4,353,993 | 10/1982 | McCrossin | 521/65 |
| 4,681,909 | 7/1987 | Ohta et al. | 524/272 |
| 4,743,303 | 5/1988 | Helmer et al. | 106/238 |
| 4,816,073 | 3/1989 | Helmer et al. | 106/238 |
| 4,842,691 | 6/1989 | Nakajima et al. | 162/180 |
| 4,919,725 | 4/1990 | Jones | 106/238 |
| 4,943,608 | 7/1990 | Takahasi et al. | 106/238 |
| 4,983,257 | 1/1991 | Schultz et al. | 106/238 |
| 5,192,363 | 3/1993 | Bussell et al. | 162/180 |
| 5,201,944 | 4/1993 | Nakata et al. | 162/180 |

FOREIGN PATENT DOCUMENTS

| | | |
|---|---|---|
| 275851 | 7/1988 | European Pat. Off. ............ 162/180 |
| 52-077206 | 6/1977 | Japan . |
| 53-32380 | 3/1978 | Japan . |
| 54-36242 | 3/1979 | Japan . |
| 54-036242 | 3/1979 | Japan . |
| 61-108796 | 5/1986 | Japan . |
| 62-223393 | 10/1987 | Japan . |
| 62-250297 | 10/1987 | Japan . |
| 63-120198 | 5/1988 | Japan . |
| 03227481 | 10/1991 | Japan . |

OTHER PUBLICATIONS

Tappi Papermakers Conference 1988, *Proceedings*, 1988, Palmer House, Chicago, Illinois, Apr. 11–13, 1988, pp. 181–187.

*Primary Examiner*—Anthony Green
*Attorney, Agent, or Firm*—Stevens, Davis, Miller & Mosher

[57] ABSTRACT

This invention provides a rosin emulsion sizing agent for papermaking comprising a fortified or unfortified rosin-epoxy compound obtained by reacting a rosin and an epoxy compound, wherein the rosin-epoxy compound is dispersed in water with the aid of an emulsifying and dispersing agent, and paper sized therewith and a method of sizing using the same. The rosin emulsion sizing agent of the present invention exhibits an distinguished sizing effect in neutral papermaking systems even when calcium carbonate is contained therein and is excellent in mechanical and storage stabilities while causing little foaming in the papermaking system. In addition, the sizing agent presents no significant difficulties in its production.

4 Claims, No Drawings

ROSIN EMULSION SIZING AGENT, PAPER SIZED THEREWITH AND METHOD OF SIZING USING THE SAME

FIELD OF THE INVENTION

This invention relates to a rosin emulsion sizing agent, paper sized therewith and a sizing method using the same. More specifically it is concerned with the sizing agent comprising a rosin-epoxy compound obtained by reacting a rosin and an epoxy compound which exhibits an excellent sizing effect in papermaking systems of not only acidic but also neutral ranges shows remarkably reduced foaming during the papermaking process as well as excellent mechanical and storage stabilities, and paper sized therewith and a sizing method using the same.

BACKGROUND OF THE INVENTION

Development of measures to meet the improvement of paper quality and the employment of the closed water recycling system is an issue of urgent necessity in the papermaking industry. It is also confronted with difficulties involved in using waste paper and brokes containing calcium carbonate as materials for the production of paper. In order to cope with these problems, papermaking in the neutral range with reduced amount of alum (crude aluminum sulfate) has been more commonly conducted.

Fortired rosin sizing agents are usually used in conventional papermaking systems wherein significant amount of alum is added. The sizing effect of these sizing agents, especially of rosin soap sizing agents comprising an alkali salt of a fortified rosin, falls sharply as the addition amount of alum is decreased and the pH of the papermaking system is made higher up to near the neutral papermaking range. The deterioration of the sizing effect is conspicuous when the papermaking system contains calcium carbonate. To prevent the deterioration of the sizing effect, addition of alum in a large amount is necessitated after all, which lowers the pH of the papermaking system to the acidic range, which in turn causes degradation of the quality of paper and other operational and economical problems.

Cationic rosin emulsion sizing agents, which can be obtained by dispersing a fortified rosin in water as finely divided particles with the aid of a cationic emulsifying and dispersing agent, have properties of fixing onto the pulp fiber by themselves and require less amount of alum to develop sufficient sizing. It is also known that they exhibit an excellent sizing effect in papermaking systems of almost neutral pH ranges (See TAPPI Papermakers Conference 1988, pp 181–187).

However, improvements are still required of such cationic rosin emulsions. That is, their preparation on a commercial scale is relatively difficult compared with that of conventional anionic rosin sizing agents and their storage stability, sizing performance and foaming properties in a papermaking system containing calcium carbonate are not satisfactory.

Under the circumstances, neutral papermaking sizing agents for use in papermaking in the neutral range have been developed, examples of which include sizing agents prepared by dispersing alkenyl succinic anhydride, alkyl ketene dimer and the like in a dispersion medium such as water. The major problem associated with these agents is that they incur increase in cost for the production of paper because either one of the above-mentioned compounds is expensive. They also present operational problems, being apt to cause contamination in the papermaking system, for instance, on the press roll and the like. Furthermore, they are slow to develop their sizing effect.

Rosin sizing agents having an improved sizing effect in neutral papermaking systems are proposed in Japanese Laid-open Patent Publication Nos. 62-223393 and 62-250297 which disclose sizing agents comprising an ester compound of a tri- or quadrihydric alcohol and a rosin compound. Some of the drawbacks associated with these sizing agents are that they require ester compounds in such an amount that their content is over 20 wt %, preferably 40 wt %, that their sizing effect in acidic papermaking systems is not satisfactory and that they incur increase in production cost since the esterification reaction between such an alcohols and a rosin proceeds slowly and requires prolonged heating in order to attain a sufficiently low acid value.

As described above, there is a demand for a rosin emulsion sizing agent which rapidly develops an excellent sizing effect in papermaking systems wherein the addition of alum is limited to a low level and the pH is increased up to around neutrality and which shows excellent mechanical and storage stabilities, and remarkably reduced foaming in the papermaking system, especially such a sizing agent for neutral papermaking systems containing calcium carbonate, and sized paper and a sizing method using the same.

DISCLOSURE OF THE INVENTION

The present invention provides a rosin emulsion sizing agent for papermaking which solves the above-mentioned problems. For this purpose, the sizing agent of the present invention contains an unfortified and/or fortified rosin-epoxy compound obtained by reacting a rosin compound and an epoxy compound, said rosin-epoxy compounds being dispersed in water with the aid of an emulsifying and dispersing agent. Preferably, the epoxy compound used for this purpose is an epoxy resin selected from glycidyl ether, glycidyl ester, glycidyl amine, alicyclic epoxide and linear aliphatic epoxide. The rosin-epoxy compound is preferably a reaction product obtained by reacting 0.2–100 equivalent of carboxyl group contained in the rosin per one equivalent of epoxy group in the epoxy compound.

The sizing agent preferably further contains at least one rosin and comprises a dispersion in water having a solids concentration of 20–60 wt % obtained by dispersing the mixture consisting of not more than 98 weight parts of the rosin, 2–100 weight parts of the rosin-epoxy compound and 0.1–20 weight parts of the emulsifying and dispersing agent.

The present invention also provides paper sized with a rosin emulsion sizing agent described above and a sizing method using such an sizing agent.

An example of the epoxy compound usable in the present invention is one containing two or more oxirane rings in a molecule. Epoxy resins having a molecular weight in the oligomer range (M. W.: not more than 10,000) may be mentioned as an example of such a compound but other suitable compounds can be used.

Such epoxy resins can be prepared by the addition reaction followed by the ring closure by dehydrochlorination of epichlorohydrin or the oxidation of a double bond. They can be grouped in accordance with their chemical structure into the epoxy resins of the following types: glycidyl ether, glycidyl ester, glycidyl amine, alicyclic epoxide and linear aliphatic epoxide types, etc. Any epoxy resin of these types can be used in the present invention. Examples of such resins which are commercially available include glycidyl ether type resins such as bisphenol A, hydrogenated bisphenol A, brominated bisphenol A, bisphenol F, o-cresol novolak resins, phenol novolak resins, polyalcohol, polyglycol, etc., poly(glycidyl amine), epoxy-modified polyol, glyoxal, glycidyl ester of a dimer acid, epoxy resins modified by a dimer acid, gum or acrylic acid, glycidyl ester of an tertiary aliphatic acid, etc. Any one of these epoxy compounds and epoxy-functional diluents can be used singly or in combination.

Examples of the rosin usable for the reaction with one of the above-mentioned epoxy compounds to prepare the sizing agent of the present invention include gum rosin, tall oil rosin, wood rosin and such rosins which have been modified. These rosins can be used singly or in combination. Examples of the modified rosin include partially or substantially completely hydrogenated rosins, or rosins subjected to disproportionation, polymerization or the reaction with formaldehyde.

Fortified rosins are also useful for the reaction with the epoxy compound, which are obtained by subjecting unfortified rosins to the addition reaction with an $\alpha$, $\beta$-unsaturated carboxylic acid. Examples of the $\alpha$, $\beta$-unsaturated carboxylic acid usable for this purpose include fumaric acid, maleic acid, maleic anhydride, itaconic acid, itaconic anhydride, citraconic acid, citraconic anhydride, acrylic acid and methacrylic acid, etc. They can be used singly or in combination.

The rosin-epoxy compound can be prepared by reacting an epoxy compound with a rosin at a ratio in a specific range. That is, a suitable reaction vessel is charged with these starting materials containing 0.2–100, preferably 0.5–50, equivalents of carboxyl group in the rosin per one equivalent of epoxy group in an epoxy compound, typically an epoxy resin, and the mixture is agitated at a temperature of about 150° C. to about 300° C. for about 3 to about 10 hours either in the presence of or in the absence of a catalyst.

Sizing agents prepared from a rosin-epoxy compound having an equivalent ratio mentioned above of less than 0.2 do not exhibit excellent sizing effect, which may be attributed to the presence of residual hydroxy groups formed in the addition reaction between the carboxyl groups in the rosin and the epoxy groups (oxirane rings) or the hydrolysis of the epoxy groups. When the equivalent ratio is more than 100, the amount of the rosin-epoxy compound in the total solids in the sizing agent is insufficient and the sizing effect thereof may be unsatisfactory, especially when used in the neutral range.

It is supposed that the reaction between the epoxy compound and the rosin proceeds as follows: first, carboxyl groups contained in rosin molecules add to oxirane rings of the epoxy compound to form ester linkages and hydroxyl groups; and then the esterification reaction accompanied by the dehydration reaction between the thus formed hydroxy groups and carboxyl groups of the other rosin molecules occurs as well as the addition (polymerization) reaction between the oxirane rings and the hydroxy groups. The addition reaction between the rosin and the oxirane rings is specifically accelerated by a catalyst such as tertiary amine, quaternary ammonium and the like and proceeds at a relatively low temperature and in a short period of time, which provides operational and economical advantages over the conventional process in which esterification with polyhydric alcohol proceeds only through the dehydration reaction path.

Examples of the rosin-epoxy compound usable in the present invention include a reaction product in which one or two or more rosin molecules add to or form esterification linkages with two or more oxirane rings in a molecule of the epoxy compound. Such a reaction product may contain unreacted starting materials. The sizing agent of the present invention contains such a reaction product in which a molecule of the epoxy compound forms one or more linkages with at least one rosin molecule preferably in an amount of 2–90 wt %, more preferably 5–60 wt %, based on the total amount of rosins (rosin compounds, rosin-epoxy compounds and epoxy resins). When the above-mentioned content is less than 2 wt %, the effect of the invention in improving sizing performance and the like will not necessarily develop well while the effect saturates when the content is over 60 wt %, and the content over 90 wt % is economically disadvantageous incurring too much cost.

The rosin-epoxy compound fortified with an $\alpha$, $\beta$-unsaturated carboxylic acid as described above relating to the rosin compound can be also used singly or in combination with unfortified rosin-epoxy compounds. The content of such a fortified rosin-epoxy compound in the sizing agent is limited likewise that of unfortified one.

Any suitable process can be used for incorporating the rosin-epoxy compound in the sizing agent. For example, a reaction product containing a rosin-epoxy compound, just as obtained or after fortified with an $\alpha$, $\beta$-unsaturated carboxylic acid, is dispersed in water to form an emulsion, or, 2–100 weight parts of a reaction product containing a rosin-epoxy compound and 98–0 weight parts of a rosin, preferably a rosin fortified with an $\alpha$, $\beta$-unsaturated carboxylic acid, are molten and mixed and then dispersed to form an emulsion. The total solids content of the thus formed emulsion is preferably 20–60 wt %, more preferably, 30–50 wt %.

In the present invention, any suitable emulsifying and dispersing agent can be used for dispersing rosins to form an emulsion. Various kinds of low-molecular weight surfactants, polymer surfactants and protective colloids such as casein, polyvinyl alcohol, modified starch can be used singly or in combination.

Examples of the surfactant include anionic surfactants such as alkali metal salts of rosins, alkali metal salts of fortified rosins, alkylbenzene sulfonates, salts of polyoxyethylenealkylether sulfuric acid ester, salts of polyoxyethylenestyrylphenylether sulfuric acid ester, salts of alkylsulfuric acid ester, salts of alkylnaphthalenesulfonic acid ester, condensates of naphthalenesulfonate and formalin, salts of polyoxyethylenealkylether sulfosuccinic acid monoester, salts of polyoxystyrylphenylether sulfosuccinic acid monoester, etc.; nonionic surfactants such as polyoxyethylenealkylether, polyoxyethylenealkylphenylether, polyoxyethylenestyrylphenylether, aliphatic acid esters of polyoxypropylenepolyoxyethyleneglycol glycerine, aliphatic acid esters of sorbitan, aliphatic acid esters of polyethyleneglycol, aliphatic acid esters of polyoxyethylenesorbitan, aliphatic acid esters of sucrose, aliphatic acid esters of pentaerythritol, aliphatic acid esters of propylene glycol and aliphatic acid diethanolamide, polyoxypropylene, polyoxyethylene glycol, etc.; cationic surfactants such as include tetraalkylammonium chloride, trialkylbenzylammonium chloride, alkylamine, oxyethylenealkylamine, polyoxyethylenealkylamine, etc. Examples of high-molecular weight surfactants include anionic styrene-(meth)acrylic acid copolymers which have been partially or completely saponified, anionic or cationic (meth)acrylic acid ester or (meth)acrylamide copolymers, cationic polyaminopolyamide-epichlorohydrine resins, alkylenepolyamine-epichlorohydrin resins, poly(diallyamine)-epichlorohydrin resins, etc. Each one of these surfactants can be used singly or in combination with others.

Any known process can be used for preparing the sizing agent of the present invention. For example, in accordance with the "solvent process" as described in Japanese Patent Publication NO. 54-36242, a reaction product containing a rosin-epoxy compound is dissolved in a solvent and after an emulsifying and dispersing agent mentioned above is added thereto, the mixture is passed through a homogenizer to form an oil-in-water type emulsion; in accordance with the process as described in Japanese Laid-open Patent Publication NO. 52-77206, a reaction product containing a rosin-epoxy compound is molten and mixed with an emulsifying and dispersing agent to form a water-in-oil type emulsion and then water is added thereto to effect inversion to form an oil-in-water type emulsion; or in accordance with the "mechanical process" as described in Japanese Patent Publication NO. 53-32380, a reaction product containing a rosin-epoxy compound is passed through a homogenizer under high pressure to form an oil-in-water type emulsion.

The thus obtained rosin sizing agent of the present invention containing a rosin-epoxy compound exhibits excellent mechanical and storage stabilities compared with conventional rosin sizing agents which do not contain such a compound. The sizing agent of the present invention also shows good sizing performance in conventional acidic papermaking systems and further enables sizing in neutral papermaking systems in any sizing degree as desired even when calcium carbonate, which may be inevitably contained in or added intentionally to the papermaking system, is present in the papermaking system while exhibiting improved foaming properties in the papermaking system.

As will be understood from the above description, the sizing agent of the present invention has advantages over conventional neutral sizing agents e.g. alkylketene dimer or alkenyl succinic anhydride especially for use in the bellow mentioned papermaking systems in that the former is excellent in the sizing effect for pulp containing high-yield pulp, rapidly develops sizing and causes less significant contamination in the papermaking equipment such as press roll and dryer canvas:

(1) Papermaking systems wherein the use of alum is not allowed or limited to a low level including those for the production of neutral machine glazed paper, neutral liner, can liner, metal plate interleaving paper, etc.;

(2) Papermaking systems wherein waste paper containing calcium carbonate is used as material for the production of paper including those for the production of gypsum liner board, white board, coating base paper, groundwood-pulp-containing paper, liner for general use, corrugating medium, etc.;

(3) Papermaking systems where calcium carbonate is used as filler including those for the production of neutral printing/writing paper, neutral coating base paper, neutral PPC paper, neutral thermographic base paper, neutral pressure sensitive base paper, neutral paper for ink-jet printing, neutral information paper, etc.; and (4) Papermaking systems in which the use of retention aids is restricted including those for the production of kraft paper, etc.

The sizing agent of the present invention also exhibits an excellent sizing effect in papermaking systems in which a significant amount of alum is used.

According to the sizing method of the present invention, the rosin emulsion sizing agent of the present invention is added to the papermaking system, for example, at the wet end in the production process of paper or paperboard. Specifically, the sizing agent is added to an aqueous dispersion of pulp fibers preferably in an amount of 0.005–10% , more preferably 0.05–5%, as weight of the solids in the agent by dry weight of the dispersion.

In preparing the above-mentioned various types of paper and paperboard, bleached or unbleached chemical pulp such as kraft pulp and sulfite pulp; bleached or unbleached high yield pulp such as groundwood pulp, mechanical pulp and thermomechanical pulp; waste paper such as waste newspaper, waste magazine paper, waste corrugated board and deinked waste paper can be used. Mixture of such pulp material and asbestos, polyamide, polyester, poplyolefin and the like are also useful.

Optionally, additives such as fillers, dyes, dry-strength agents, wet-strength agents, retention aids and drainage aids may be used for providing the paper or paperboard with specifically desired properties. Examples of the filler include clay, talc and ground or precipitated calcium carbonate, which can be used singly or in combination.

Examples of the dry-strength agent include anionic polyacrylamide, cationic polyacrylamide, amphoteric polyacrylamide, cationized starch, etc., which can be used singly or in combination. Examples of the wet-strength agent include polyamide-epichlorohydrin resins, melamine-formalin resins, urea-formalin resins, etc., which can be used singly or in combination with anionic polyacrylamide. Examples of the retention aid include anionic or cationic high-molecular weight polyacrylamide, combination of silica sol and cationized starch, combination of bentonite and cationic high-molecular weight polyacrylamide, etc. Examples of the drainage aid include polyethyleneimine, cationic polyacrylamide, etc. Optionally, starches, polyvinyl alcohol, dyes, coating colors, surface sizing agents, antislipping agents, etc. may be applied using a size press, gate roll coater, Billblade coater, calender, etc. Crude alum is added before, after or simultaneously with the addition of the sizing agent of the present invention.

Additives and rosins mentioned above may be made contained in the sizing agent, if necessary, which can be carried out simultaneously with or separately from the addition of the rosin-epoxy compounds in the same or different way.

The rosin sizing agent of the present invention is also usable as a surface sizing agent. In this case, it is applied on wet paper which has been made by any of the conventional methods such as spraying, dipping, coating and the like.

EMBODIMENT OF THE INVENTION

The following examples of the preparation of rosin-epoxy compounds and the demonstrative and comparative examples of sizing agents illustrate the present invention more specifically. These examples, however, should not be taken as limiting the present invention. Part and % in the following examples are based on weight, unless contrarily mentioned.

(1) Preparation of reaction product of a rosin and an epoxy compound

Reaction products of a rosin and an epoxy compound (A-1)–(A-14) (for working examples) and (A-15) and (A-16) (for comparative examples) were prepared in the following manner.

(1)-1 Preparation of (A-1)

600 parts of a gum rosin (acid value: 170) and 160 parts of an epoxy resin(marketed by Dainippon Ink & Chemicals, Inc. under the brand name "720") were placed in a flask (volume: one liter) equipped with a stirrer, a thermometer, a nitrogen-introducing port and a condenser, heated under nitrogen flow until the temperature reached 250° C. and kept at the temperature for 10 hours to give the reaction product (A-1).

(1)-2 Preparation of (A-2)–(A-14) and (A-15, A-16)

Reaction products (A-2)–(A-14) and (A-15, A-16) were prepared in the same manner as described about (A-1) from rosins and epoxy compounds summarized in Table 1.

(2) Preparation of fumaric-acid fortified rosin

Fumaric acid fortified rosins (B-1)–(B-4) (for working examples) and (B-5) (for comparative examples) were prepared in the following manner.

(2)-1 Preparation of (B-1)

70 parts of fumaric acid were slowly added to 460 parts of a molten gum rosin at about 200° C. After the reaction was almost completed, 470 parts of tall oil rosin modified by formaldehyde (modification rate: 3%) were added and the molten reaction mixture was further stirred to be homogeneous and then allowed to cool to room temperature. The thus obtained reaction product B-1) was a fortified rosin which contained 7% of fumaric acid added thereto.

(2)-2 Preparation of (B-2) [fumaric acid treated compound of (A-1)]

465 parts of the reaction product of a rosin and an epoxy compound (A-1) obtained in above (1)-1 were heated to about 200° C. to be molten. 35 parts of fumaric acid was added thereto and the mixture were kept at 200° C. for 3 hours. The thus obtained fumaric acid treated compound was designated (B-2).

(2)-3 Preparation of (B-3) [fumaric acid treated compound of (A-5)], (B-4) [fumaric acid treated compound of (A-6)], (B-5) [fumaric acid treated compound of (A-16) ], Fumaric acid treated compounds (B-3), (B-4) and (B-5) were prepared in the same manner as described about (B-2) respectively from the reaction product of a rosin and an epoxy compounds (A-5), (A-6) and (A-16). These compounds and (B-2) are fortified compounds of rosin-epoxy compounds.

(3) Preparation of reaction product of a rosin and glycerin

A reaction product of a rosin and glycerin (A-17) was prepared in the same manner as Preparation Example 1 of Japanese Laid-open Patent Publication No. 62-223393 (1987) as follows.

100 parts of a gum rosin (acid value: 170) and 8 parts of glycerin were placed in a flask (volume: one liter) equipped with a stirrer, a thermometer, a nitrogen-introducing port and a condenser. The mixture was allowed to react at 250° C. for 12 hours to give the reaction product (A-17).

TABLE 1

| Reaction Products | Rosin | Epoxy Resin | Equivalent Ratio (COOH/Epoxy group) | Acid Value KOH mg/g | Softening Temp. °C. |
|---|---|---|---|---|---|
| A-1 | Gum Rosin | 720 | 1.7 | 34 | 83 |
| A-2 | Gum Rosin | 720 | 0.2 | 13 | 52 |
| A-3 | Gum Rosin | 720 | 0.5 | 18 | 63 |
| A-4 | Gum Rosin | 720 | 2.5 | 51 | 85 |
| K-5 | Gum Rosin | 720 | 50 | 166 | 80 |
| A-6 | Gum Rosin | 720 | 100 | 168 | 81 |
| A-7 | Tall Oil Rosin | 720 | 2.0 | 38 | 81 |
| A-8 | Fortified Rosin | 720 | 2.0 | 105 | 112 |
| A-9 | Gum Rosin | R710 | 2.0 | 40 | 83 |
| A-10 | Gum Rosin | R508 | 2.0 | 32 | 91 |
| A-11 | Gum Rosin | YDF170 | 2.0 | 35 | 85 |
| A-12 | Gum Rosin | YDPN638 | 2.0 | 41 | 82 |
| A-13 | Gum Rosin | PG207 | 2.0 | 34 | 79 |
| A-14 | Gum Rosin | GAN | 2.0 | 36 | 86 |
| A-15 | Gum Rosin | 720 | 0.1 | 2 | 43 |
| A-16 | Gum Rosin | 720 | 120 | 169 | 81 |
| A-17 | Gum Rosin | Glycerin | 1.2* | 37 | 85 |

1. Fortified rosin used in (A-8) is a reaction product designated as (B-1) in the description and the equivalent ratio (COOH/epoxy) was calculated based on the amount of COOH contained in the rosin before fortied.
2. Abbreviations in the column "Epoxy resin" mean as follows:
720: Polyhydric alcohol epoxy resin having an epoxy equivalent(g/eq) of 150
R710: Polyphenol type epoxy resin having an epoxy equivalent(g/eq) of 326
R508: Ester type epoxy resin having an epoxy equivalent(g/eq) of 278
YDPM638: Novolak type epoxy resin having an epoxy equivalent(g/eq) of 180
YDF170: Bisphenol F type epoxy resin having an epoxy equivalent(g/eq) of 168
PG207: Polyglycol type epoxy resin having an epoxy equivalent(g/eq) of 316
GAN: Glycidylamine type epoxy resin having an epoxy equivalent(g/eq) of 118 (720 is available from Dainippon Ink & Chemicals Inc.; R710 and R508 are from Mitsui Petrochemical Industries, Ltd.; YDPM638, YDF170 and PG207 are products of Toto Kasei Inc.; and Gan is available from Nippon Kayaku Co., Ltd.)
3. Asterisked equivalent ratio is the ratio of COOH/OH.

(4) Preparation of polymer dispersant

Polymer dispersants for stabilizing the dispersion of rosin compounds (C-1)–(C-3) (for working examples) were prepared as follows.

(4)-1 Preparation of cationic polymer dispersant (C-1)

A cationic polymer dispersant (C-1) was prepared as follows in accordance with the process for preparing a cationic poly(meth)acrylamide having hydrophobic groups used in Example 1 of Japanese Patent Application NO. 2-177,534 (1990) as follows.

31.4 parts of dimethylaminoethyl methacrylate, 85.3 parts of a 50% aqueous solution of acrylamide, 20.8 parts of styrene, 100.6 parts of deionized water, 143.3parts of isopropyl alcohol and 0.6 part of n-dodecylmercaptan were placed in a four-necked flask (volume: one liter) equipped with a stirrer, a thermometer, a condenser and a nitrogen-introducing port. The pH of the mixture was adjusted to 4.5 with a 20% acetic acid aqueous solution. The mixture was stirred and warmed to 60° C. under nitrogen atmosphere. 2.3 parts of a 5% aqueous solution of ammonium persulfate were added thereto and the temperature of the mixture was raised to 80° C. After the mixture was kept at the temperature for 1.5 hours, 0.7 part of the 5% aqueous solution of ammonium persulfate was added. After the reaction mixture was maintained at the same temperature for another hour, 100 parts of deionized water were added and the isopropyl alcohol was removed by distillation. The polymer solution was diluted with deionized water after the distillation was finished. The thus obtained cationic high-molecular weight dispersant C-1 was a polymer solution containing 20.4% solids.

(4)-2 Preparation of cationic polymer dispersant (C-2)

A cationic polymer dispersant (C-2) was prepared as follows in accordance with the process for preparing a cationic copolymer of alkylaminoalkylamide derivative of methacrylic acid used in Example 4 of Japanese Laid open Patent Publication NO. 63-120198 (1988).

30 parts of 2-ethylhexyl acrylate, 70 parts of N,N-dimethylaminopropyl methacrylate acrylamide, 2 parts of t-dodecylmercaptan and 2 parts of benzoyl peroxide were heated in toluene at 100° C. for 5 hours to be polymerized. Deionized water and one molar equivalent of dimethylsulfuric acid to N,N-dimethylaminopropyl methacrylate acrylamide were added thereto and the mixture was allowed to react at 40° C. for 4 hours. After that, toluene was removed by distillation and the polymer solution was diluted with deionized water. The thus obtained cationic high-molecular weight dispersant C-2 was a polymer solution containing 25% solids.

(4)-3 Preparation of polymer dispersant (C-3)

An anionic polymer dispersant (C-3) was prepared as follows in accordance with the process described in Referential Example 10 of Japanese Laid-open Patent Publication NO. 61-108796 (1986).

55 parts of styrene, 30 parts of methacrylic acid, 5 parts of itaconic acid, 10 parts of lauryl acrylate, 50 parts of 10% sodium naphthalenesulfonate-formalin condensate, one part of ammonium persulfate and 200 parts of water were stirred and mixed and heated at 150° C. under pressure for 30 minutes. The mixture was allowed to cool to 70° C. and 35.5 parts of 48.5% of sodium hydroxide and 7 parts of water were slowly added thereto. Then the mixture was stirred for 30 minutes and allowed to cool to room temperature. The thus obtained anionic polymer dispersant C-3 was a dispersion of saponified copolymer of styrene and methacrylic acid containing 30% solids.

(5) Preparation of paper sizing agents

(5)-1 Example 1

25 parts of the above-mentioned reaction compound of a rosin and an epoxy compound (A-1) obtained in (1)-1 and 75 parts of fumaric acid fortified rosin (B-1) were mixed and molten by heating it to about 150° C. 25 parts of an aqueous solution (C-1) containing cationic poly(meth)acrylamide having hydrophobic groups were added under agitation to form a water-in-oil emulsion.

Hot water was slowly added to the thus obtained emulsion to convert the emulsion into the oil-in-water type. Hot water was further added quickly to stabilize the resulting oil-in-water type emulsion and the emulsion was allowed to cool to room temperature.

The thus obtained emulsion contained 50.5% solids and the accumulative median particle size measured with a Master Sizer (manufactured by Malvern Instruments Ltd.) was 0.39 $\mu$m. The emulsion was stable for a long period of time.

(5)-2 Examples 2–16, 21, 22

In the same manner as in Example 1, paper sizing agents (Examples 2–16, 21, 22) were prepared from 100 parts of molten mixture of the above-mentioned reaction product of a rosin and an epoxy compound (A-1)–(A-10) and (B-2)–(B-4) in the bending ratio summarized in Table 2 using 25 parts of fortified rosin (B-1) and the above-mentioned polymer dispersant (C-1) or 17 parts of (C-3).

(5)-3 Examples 17–18

Emulsion Sizing agents were prepared as follows in accordance with the process described in Example 4 of Japanese Laid-open Patent Publication NO. 63-120198 (1988).

159 parts of the above-mentioned fumaric-acid fortified rosin [(2)-1] and 53 parts of the reaction product of a rosin and an epoxy compound (A-11) were molten by heating to about 150° C. and 140 parts of the aqueous solution (solids: 35 parts) of cationic copolymer of alkylaminoalkylamide derivative of methacrylic acid (C-2), 2.5 parts of lauryltrimethylammonium chloride and 270 parts of water were mixed under elevated temperature and high pressure. The mixture was made to pass through an industrial homogenizer under a pressure of about 200 kg/cm$^2$ and allowed to cool to room temperature. The thus obtained emulsion sizing agent (Example 17) contained about 40% solids.

Another emulsion sizing agent (Example 18) was prepared using the reaction product of a rosin and an epoxy resin (A-12) in place of (A-11). The emulsion contained about 40% solids.

(5)-4 Examples 19–20

Emulsion Sizing agents were prepared as follows in accordance with the process described in Example 1 of U.S. Pat. No. 3,966,654 (1988).

225 parts of the above-mentioned fumaric-acid fortified rosin [(2)-1] and 75 parts of the reaction product of a rosin and an epoxy compound (A-13) were dissolved in 300 parts of benzene and 400 parts of the polyaminopolyamide-epichlorohydrin resin solution (solids: 50%) (C-4) prepared in accordance with the process described in Referential Example 17 of the above-mentioned U.S. Pat. No. 3,966,654 and 350 parts of water were added thereto. The mixture was made to pass through an industrial homogenizer twice under a pressure of about 150 kg/cm². Then the benzene was completely removed by vacuum distillation. The thus obtained rosin emulsion contained about 35.1% solids.

The compositions and properties of these working and comparative examples are summarized in Tables 2 and 3.

TABLE 2

| | | Paper Sizing Composition | | | Sizing Composition | |
|---|---|---|---|---|---|---|
| | | Wt. Ratio of Rosins | | | | |
| Ex. | Reaction Product | Rosin-Epoxy Compound | Fortified Rosin (B-1) | Dispersant | Ave. Particle size (μm) | Solids % |
| 1 | A-1 | 25 | 75 | C-1 | 0.39 | 50.6 |
| 2 | A-2 | 25 | 75 | C-1 | 0.38 | 50.2 |
| 3 | A-3 | 25 | 75 | C-1 | 0.38 | 50.3 |
| 4 | A-4 | 25 | 75 | C-1 | 0.39 | 50.8 |
| 5 | B-2 | 25 | 75 | C-1 | 0.40 | 50.1 |
| 6 | B-3 | 100 | 0 | C-1 | 0.42 | 50.6 |
| 7 | B-4 | 100 | 0 | C-1 | 0.42 | 50.6 |
| 8 | A-1 | 2 | 98 | C-1 | 0.39 | 50.5 |
| 9 | A-1 | 5 | 95 | C-1 | 0.38 | 50.3 |
| 10 | A-1 | 50 | 50 | C-1 | 0.40 | 51.4 |
| 11 | A-1 | 70 | 30 | C-1 | 0.43 | 50.2 |
| 12 | A-1 | 100 | 0 | C-1 | 0.46 | 50.2 |
| 13 | A-7 | 25 | 75 | C-1 | 0.39 | 50.5 |
| 14 | A-8 | 25 | 75 | C-1 | 0.39 | 50.1 |
| 15 | A-9 | 25 | 75 | C-1 | 0.41 | 50.1 |
| 16 | A-10 | 25 | 75 | C-1 | 0.40 | 50.0 |
| 17 | A-11 | 25 | 75 | C-2 | 0.45 | 40.1 |
| 18 | A-12 | 25 | 75 | C-2 | 0.43 | 40.2 |
| 19 | A-13 | 25 | 75 | C-4 | 0.55 | 35.2 |
| 20 | A-14 | 25 | 75 | C-4 | 0.56 | 35.3 |
| 21 | A-1 | 25 | 75 | C-3 | 0.31 | 50.1 |
| 22 | A-1 + B-2 | 15 (A-1) 10 (B-2) | 75 | C-1 | 0.40 | 50.3 |

TABLE 3

| | | Paper Sizing Composition | | | Sizing Composition | |
|---|---|---|---|---|---|---|
| | | Wt. Ratio of Rosins | | | | |
| Ex. | Reaction Product | Rosin-Epoxy Compound | Fortified Rosin (B-1) | Dispersant | Ave. Particle size (μm) | Solids % |
| 1 | A-15 | 25 | 75 | C-1 | 0.42 | 50.2 |
| 2 | B-5 | 100 | 0 | C-1 | 0.41 | 50.2 |
| 3 | A-17 | 70 | 30 | C-5 | 0.39 | 35.1 |
| 4 | — | 0 | 100 | C-1 | 0.41 | 50.6 |
| 5 | — | 0 | 100 | C-3 | 0.29 | 50.5 | pressure of about 150 kg/cm². Then the benzene was completely removed by vacuum distillation. The thus obtained rosin emulsion (Example 19) contained about 35% solids, which consisted about 85% of rosin compounds and about 15% of polyaminopolyamide-epichlorohydrin resin.

Another emulsion sizing agent (Example 20) was prepared using the reaction product of a rosin and an epoxy resin (A-14) in place of (A-13).

(5)-5 Comparative Examples 1, 2, 4 and 5

In the same manner as in Example 1, emulsion sizing compositions (Comparative Examples 1, 2, 4 and 5) were obtained except that the mixing ratio was changed as shown in Table 3.

(5)-6 Comparative Example 3

150 parts of the above-mentioned fumaric-acid fortified rosin [(2)-1] and 150 parts of the reaction product of a rosin and glycerin (A-17) were dissolved in 300 parts of benzene and 30 parts of a 30% solution of sodium dodecylbenzene sulfonate (C-5) and 550 parts of water were added thereto. The mixture was made to pass through an industrial homogenizer twice under a pressure of about 150 kg/cm². Then the benzene was com- (6) Sizing effect test (6)-1 Sizing effect test 1

Bleached kraft pulp (mixture of soft wood pulp and hard wood pulp in the ratio of 1:4) was beaten with a beater in diluting water of 100 ppm hardness till the Canadian standard freeness thereof reached 350 ml. The amount of water was such that the pulp consistency thereof was 2.5%.

1.2 liter of the pulp slurry was placed in the breaker and 0.4% of the sizing agent of the examples (or comparative examples) and 0.25% of crude alum were simultaneously added thereto. Then the pH of the slurry was adjusted to 7.5 with caustic soda. After the mixture was stirred for 30 minutes, the pulp slurry was diluted with diluting water of pH 7.5 to a consistency of 0.25% and 0.05% of a cationic polyacrylamide retention aid ("Epinox DS 510" marketed by DIC-Hercules Chemicals, Inc.) was added. From the thus prepared paper stock (temperature: 40° C.), test paper having a basis weight of 65 g/m² was made using a Noble and Wood papermachine. The wet test paper was dried at 100° C. for 60 seconds by a drum dryer.

After conditioned in an atmosphere of fixed temperature and humidity (20° C. and 60% RH) for 24 hours, the sizing degree was measured by the Stöckigt method.

The conditions of this sizing effect test correspond to those of a papermaking system in which the use of crude alum is limited to a low level for making neutral machine glazed paper and metal plate interleaving paper, etc.

(6)-2 Sizing effect test 2

1.2 liter of the pulp slurry prepared in the same manner as in the above-mentioned Sizing Effect Test 1 was placed in a breaker and 0.5% of the sizing agent of the examples (or comparative examples), 1.0% of crude alum and 0.2% of the above-mentioned DS 510 dry-strength/retention aid were added. After the mixture was stirred for 10 minutes, the pulp slurry was diluted to a consistency of 0.25% with diluting water of pH 8 and 10% of precipitated calcium carbonate ("Tamapearl 121S" marketed by Okutama Industry Co., Ltd.) and 0.01% of a cationic polyacrylamide retention aid ("Hi Reten 104" marketed by DIC-Hercules Chemicals, Inc.) were added thereto. From the thus prepared paper stock (temperature: 40° C.), test paper having a basis weight of 65 g/m² was made using a Noble and Wood papermachine. The wet test paper was dried at 100° C. for 60 seconds with a drum dryer. After conditioned in an atmosphere of fixed temperature and humidity (20° C. and 60% RH) for 24 hours, the sizing degree was measured by the Stöckigt method.

The conditions of this sizing effect test correspond to those of a papermaking system in which calcium carbonate is used as filler for making neutral printing/writing paper, neutral coating base paper, neutral PPC paper and neutral thermographic paper, neutral pressure sensitive paper and neutral information paper, etc.

(6)-3 Sizing effect test 3

Waste corrugated board was beaten with a beater in diluting water of 100 ppm hardness till the Canadian standard freeness thereof reached 400 ml. The amount of water was such that the pulp consistency thereof was 2.5%. 1.2 liter of the pulp slurry was placed in a breaker and 0.2% of the sizing agent of the examples (or comparative examples) was added. After the mixture was stirred for 10 minutes, the pulp slurry was diluted to a pulp consistency of 0.25% and 0.05% of the above-mentioned DS 510 was added. From the thus prepared paper stock (temperature: 40° C.), test paper having a basis weight of 100 g/m² was made using a Noble and Wood papermachine. The wet test paper was dried at 100° C. for 80 seconds with a drum dryer. After conditioned in an atmosphere of fixed temperature and humidity (20° C. and 60% RH) for 24 hours, the sizing degree was measured by the one-minute Cobb method.

The conditions of this sizing effect test correspond to those of a papermaking system in which the use of crude alum is not allowable for making neutral liner and can liner, etc.

(6)-4 Sizing effect test 4

A mixture of waste coated paper and bleached hard wood pulp in a mixing ratio of 1:4 was beaten with a beater in diluting water of 100 ppm hardness till the Canadian standard freeness thereof reached 350 ml. The amount of water was such that the pulp consistency thereof was 2.5%. The content of calcium carbonate in the pulp slurry was 6% based on the weight of the pulp. 1.2 liter of the pulp slurry was placed in a breaker and 0.5% of crude alum was added thereto. After the mixture was stirred for 1 minute, the pulp slurry was diluted to a consistency of 0.25% and 0.5% of the sizing agent of the examples (or comparative examples) and 0.05% of the above-mentioned DS 510 was added thereto. From the thus prepared paper stock, test paper having a basis weight of 80 g/m² was made using a Noble and Wood papermachine. The wet test paper was dried at 100° C. for 70 seconds with a drum dryer. After conditioned in an atmosphere of fixed temperature and humidity (20° C. and 60% RH) for 24 hours, the sizing degree was measured by the one-minute Cobb method.

The conditions of this sizing effect test correspond to those of a papermaking system containing calcium carbonate which has come from waste paper materials for making gypsum liner board and white board.

The results of the above-mentioned sizing tests are summarized in Tables 4 and 5.

TABLE 4

| | Sizing Effect of Sizing Agent | | | |
| | Stöckigt Sizing Deg.(sec.) | | Cobb Sizing Deg.(g/m²) | |
| Ex. | Sizing Test 1 | Sizing Test 2 | Sizing Test 3 | Sizing Test 4 |
|---|---|---|---|---|
| 1 | 29 | 30 | 35 | 21 |
| 2 | 20 | 15 | 51 | 31 |
| 3 | 24 | 20 | 42 | 25 |
| 4 | 31 | 28 | 33 | 22 |
| 5 | 32 | 31 | 32 | 20 |
| 6 | 18 | 14 | 49 | 29 |
| 7 | 16 | 10 | 60 | 35 |
| 8 | 15 | 10 | 58 | 33 |
| 9 | 20 | 17 | 43 | 28 |
| 10 | 33 | 35 | 32 | 20 |
| 11 | 35 | 37 | 31 | 19 |
| 12 | 32 | 33 | 33 | 21 |
| 13 | 30 | 29 | 34 | 22 |
| 14 | 23 | 27 | 39 | 26 |
| 15 | 26 | 28 | 38 | 24 |
| 16 | 19 | 16 | 47 | 31 |
| 17 | 22 | 20 | 41 | 26 |
| 18 | 17 | 12 | 54 | 34 |
| 19 | 18 | 11 | 50 | 33 |
| 20 | 21 | 19 | 40 | 27 |
| 21 | 17 | 9 | 55 | 33 |
| 22 | 31 | 30 | 33 | 20 |

TABLE 5

| | Sizing Effect of Sizing Agent | | | |
| | Stöckigt Sizing Deg.(sec.) | | Cobb Sizing Deg.(g/m²) | |
| Ex. | Sizing Test 1 | Sizing Test 2 | Sizing Test 3 | Sizing Test 4 |
|---|---|---|---|---|
| 1 | 11 | 3 | 75 | 41 |
| 2 | 9 | 2 | 78 | 42 |
| 3 | 13 | 6 | 70 | 39 |
| 4 | 10 | 1 | 82 | 45 |
| 5 | 0 | 0 | 130 | 100 |

(7) Storage stability test 100 ml of the above-mentioned sizing agents of the examples and comparative examples were respectively placed in a test tube (length: 30 cm; inner diameter: 2.1 cm). After the samples were allowed to stand for two months, the thickness (mm) of the sediment settled on the bottom was measured.

(8) Mechanical stability test 50 g of the above-mentioned sizing agents of the examples and comparative examples were respectively placed in a cup and subjected to the Marlon stability test for 5 minutes under the conditions: temperature: 25° C., loading pressure: 20 kg, and rotation rate: 800 rpm. Then the sample was filtered through a mesh (mesh size: 325) and the weight of the filtration residue was determined and the weight percentage of the residue to the total solids was calculated.

(9) Foaming properties test 0.5% of the above-mentioned sizing agent of each example or comparative example and 0.25% of crude alum were simultaneously added to the pulp slurry which had been prepared as in the above-mentioned Sizing Effect Test 1 and the pH of the mixture was adjusted to 7 with caustic soda. After the mixture was stirred for 3 minutes, the pulp slurry was diluted to 0.25% with diluting water of pH 7 and 0.05% of DS 510 was added thereto. The mixture was stirred for another minute and placed in a cylindrical vessel. The pulp slurry was made to circulate by continuously pumping up a small amount of the slurry and dropping it from above one meter onto the surface of the slurry left in the vessel. The area where accumulation of foam was observed was measured after 10 minutes circulation. The percent ratio of the foaming area to the total surface area was calculated, which are shown in Table 7.

The results of the storage stability test, mechanical stability test and foaming properties test are summarized in Tables 6 and 7.

| | Properties of Sizing Agents | | |
|---|---|---|---|
| Ex. | Storage Stability (mm) | Mechanical Stability (%) | Foaming Properties (%) |
| 1 | <1 | 0.2 | 10 |
| 2 | <1 | 0.3 | 20 |
| 3 | <1 | 0.3 | 30 |
| 4 | <1 | 0.2 | 10 |
| 5 | <1 | 0.3 | 20 |
| 6 | 2 | 0.4 | 30 |
| 7 | 2 | 0.5 | 40 |
| 8 | 2 | 0.5 | 40 |
| 9 | 2 | 0.4 | 40 |
| 10 | 2 | 0.2 | 20 |
| 11 | <1 | 0.3 | 30 |
| 12 | <1 | 0.4 | 20 |
| 13 | <1 | 0.2 | 10 |
| 14 | 2 | 0.2 | 20 |
| 15 | <1 | 0.2 | 10 |
| 16 | <1 | 0.2 | 10 |
| 17 | 2 | 0.3 | 20 |
| 18 | 2 | 0.4 | 30 |
| 19 | 4 | 0.5 | 20 |
| 20 | 5 | 0.4 | 20 |
| 21 | <1 | 0.2 | 20 |
| 22 | <1 | 0.2 | 10 |

TABLE 7

| | Properties of Sizing Agents | | |
|---|---|---|---|
| Comp. Ex. | Storage Stability (mm) | Mechanical Stability (%) | Foaming Properties (%) |
| 1 | 6 | 0.6 | 70 |
| 2 | 6 | 0.7 | 70 |
| 3 | 2 | 1.1 | 80 |
| 4 | 9 | 0.9 | 80 |
| 5 | 8 | 0.8 | 90 |

Effect of the Invention

As described above, the rosin emulsion sizing agent of the present invention containing a reaction product of a rosin and an epoxy compound is excellent storage stability. In addition, it exhibits an distinguished sizing effect in the acidic and neutral papermaking systems while causing less significant foaming in the papermaking system.

What we claim is:

1. A rosin emulsion sizing agent for papermaking comprising a fortified or unfortified rosin-epoxy compound obtained by reacting a rosin and an epoxy compound containing two or more oxirane rings, said rosin-epoxy compound having an equivalent ratio of 0.2-100 equivalents of carboxyl group in the rosin per one equivalent of epoxy group in the epoxy compound, wherein the rosin-epoxy compound is dispersed in water with the aid of a material selected from the group consisting of anionic, nonionic and cationic surfactants and protective colloid materials and mixtures thereof.

2. The rosin emulsion sizing agent of claim 1, wherein said epoxy compound is selected from the group consisting of glycidyl ethers, glycidyl esters, glycidyl amines, alicyclic epoxides and linear aliphatic epoxides containing two or more oxirane rings.

3. The rosin emulsion sizing agent of claim 1, where the sizing agent further contains at least one rosin material and comprises a dispersion of the rosin material consisting of not more than 98 weight parts of the rosin material, 2-100 weight parts of the rosin-epoxy compound and 0.1-20 weight parts of the surfactant and/or protective colloid material selected from the group consisting of casein, polyvinyl alcohol and modified starch in water.

4. Paper sized with a rosin emulsion sizing agent of any of claim 1.

* * * * *